United States Patent
Brown (10) Patent No.: US 9,692,331 B2
(45) Date of Patent: Jun. 27, 2017

(54) BLDC ADAPTIVE ZERO CROSSING DETECTION

(71) Applicant: Microchip Technology Incorporated, Chandler, AZ (US)

(72) Inventor: Ward R. Brown, Chandler, AZ (US)

(73) Assignee: MICROCHIP TECHNOLOGIES INCORPORATED, Chandler, AZ (US)

( * ) Notice: Subject to any disclaimer, the term of this patent is extended or adjusted under 35 U.S.C. 154(b) by 0 days.

(21) Appl. No.: 15/053,972

(22) Filed: Feb. 25, 2016

(65) Prior Publication Data

US 2016/0254766 A1     Sep. 1, 2016

Related U.S. Application Data

(60) Provisional application No. 62/121,767, filed on Feb. 27, 2015.

(51) Int. Cl.
| | |
|---|---|
| *H02P 6/00* | (2016.01) |
| *H02P 6/182* | (2016.01) |
| *H02P 6/20* | (2016.01) |
| *H02P 27/08* | (2006.01) |

(52) U.S. Cl.
CPC ............ *H02P 6/182* (2013.01); *H02P 6/20* (2013.01); *H02P 27/08* (2013.01)

(58) Field of Classification Search
CPC .. H02P 6/15; H02P 6/157; H02P 27/08; H02P 6/182; H03K 5/26
USPC .... 318/400.35, 400.01, 400.06, 400.34, 459, 318/484
See application file for complete search history.

(56) References Cited

U.S. PATENT DOCUMENTS

| | | | | |
|---|---|---|---|---|
| 6,566,827 B2* | 5/2003 | Gotou | ............... | H02P 6/085 |
| | | | | 318/400.07 |
| 8,378,606 B2* | 2/2013 | Brown | ............... | H02P 6/182 |
| | | | | 318/400.01 |
| 2003/0231875 A1* | 12/2003 | Masino | ............... | H02P 6/12 |
| | | | | 388/800 |
| 2006/0152181 A1* | 7/2006 | Shao | ............... | H02P 6/182 |
| | | | | 318/400.34 |
| 2011/0084639 A1 | 4/2011 | Brown | ............... | 318/400.35 |
| 2014/0265967 A1* | 9/2014 | Brown | ............... | H02P 7/00 |
| | | | | 318/400.27 |

(Continued)

OTHER PUBLICATIONS

International Search Report and Written Opinion, Application No. PCT/US2016/019836, 11 pages, Jun. 14, 2016.

(Continued)

*Primary Examiner* — Bentsu Ro
*Assistant Examiner* — Thai Dinh
(74) *Attorney, Agent, or Firm* — Slayden Grubert Beard PLLC (57) ABSTRACT

BLDC adaptive zero crossing detection compares BEMF voltages from a floating phase of a BLDC motor to a reference voltage, measures a rising time interval during a rising BEMF period when the BEMF voltages are greater than the reference voltage, and a falling time interval during a falling BEMF period when the BEMF voltages are less than the reference voltage. The reference voltage is adjusted so that the rising and falling time intervals are substantially the same, thereby causing the drive voltage to be in phase with the motor self-generated voltage, thus ensuring maximum efficiency of the BLDC motor.

18 Claims, 8 Drawing Sheets

(56) References Cited

U.S. PATENT DOCUMENTS

2015/0002065 A1  1/2015  Boscolo et al. ......... 318/400.35

OTHER PUBLICATIONS

Brown, Ward, "AN857: Brushless DC Motor Control Made Easy," Microchip Technology Incorporated, 48 pages, 2002.
Yedamale, Padmaraja, "AN885: Brushless DC (BLDC) Motor Fundamentals," Microchip Technology Incorporated, 20 pages, Jul. 28, 2003.

* cited by examiner

BLDC ADAPTIVE ZERO CROSSING DETECTION

RELATED PATENT APPLICATIONS

This application claims priority to commonly owned U.S. Provisional Patent Application No. 62/121,767; filed Feb. 27, 2015; which is hereby incorporated by reference herein for all purposes.

TECHNICAL FIELD

The present disclosure relates to brushless direct current (BLDC) motors, and, more particularly, to adaptive zero crossing detection in BLDC motor applications.

BACKGROUND

Brushless direct current (BLDC) motors are used in industries such as appliances, automotive, aerospace, consumer, medical, industrial automation equipment and instrumentation. BLDC motors do not use brushes for commutation, instead, electronic commutation is used. BLDC motors have advantages over brushed DC motors and induction motors such as: better speed versus torque characteristics, higher dynamic response, higher efficiency, longer operating life, longer time intervals between service, substantially noiseless operation, and higher speed ranges. A more detailed synopsis of BLDC motors may be found in Microchip Application Note AN857, entitled "Brushless DC Motor Control Made Easy;" and Microchip Application Note AN885, entitled "Brushless DC (BLDC) Motor Fundamentals;" both at www.microchip.com, and both are hereby incorporated by reference herein for all purposes.

BLDC motor control requires three things: (1) pulse width modulation (PWM) drive voltages to control the motor speed, (2) a mechanism to commutate the stator of the BLDC motor, and (3) a way to estimate the rotor position of the BLDC motor. PWM may be used to provide a variable voltage to the stator windings of the BLDC motor for speed control thereof. The effective voltage provided thereto is proportional to the PWM duty cycle. The inductances of the stator coils act as low pass filters to smooth out the PWM voltages to substantially direct current (DC) voltages. When properly commutated, the torque-speed characteristics of a BLDC motor are substantially identical to a DC motor. The PWM derived variable voltage controls the speed of the motor and the available torque.

A three-phase BLDC motor completes an electrical cycle, i.e., 360 electrical degrees of rotation, in six steps at 60 electrical degrees per step. Synchronously at every 60 electrical degrees, winding phase current switching is updated (commutation). However, one electrical cycle may not correspond to one mechanical revolution (360 mechanical degrees) of the motor rotor. The number of electrical cycles to be repeated to complete one mechanical revolution depends upon the number of rotor pole pairs.

BLDC motors are not self-commutating and therefore are more complicated to control. BLDC motor control requires knowledge of the motor rotor position and a mechanism to commutate the BLDC motor stator windings. For closed-loop speed control of a BLDC motor there are two additional requirements, measurement of rotational speed and a pulse width modulation (PWM) drive signal to control the motor speed and power therefrom.

To sense the rotor position of the BLDC motor, Hall Effect sensors may be used to provide absolute rotor position sensing. However, Hall Effect sensors increase the cost and complexity of a BLDC motor. Sensor-less BLDC control eliminates the need for Hall Effect sensors by monitoring the back electromotive force (BEMF) voltages at each phase (A-B-C) of the motor to determine drive commutation. The drive commutation is synchronized with the motor when the BEMF of the un-driven phase crosses one-half of the motor supply voltage in the middle of the commutation period. This is referred to as "zero-crossing" where the BEMF varies above and below the zero-crossing voltage over each electrical cycle. Zero-crossing can only be detected on the un-driven phase when the drive voltage is being applied to the other two driven phases. So detecting a change of the BEMF on the un-driven phase from less than to greater than one-half of the motor supply voltage may be used during application of the drive voltage to the two driven phases for a three phase BLDC motor.

Controlling brushless DC (BLDC) motors can be challenging in particular if a BLDC motor does not provide for any sensors that are capable to determine a current position of the rotor. Hence, there is a need for a universal zero-cross detection for sensor-less BLDC motor control. One way of determining a current rotor position in BLDC applications is to use back electromotive force (BEMF) signals, which is the voltage, or electromotive force, that pushes against the current which induces it. BEMF is the voltage drop in an alternating current (AC) circuit caused by magnetic induction. Generally, when driving a BLDC motor, for example through two of its three coils of a three phase BLDC motor, BEMF signals can be received through the unused coil. BEMF signals vary in amplitude and position relative to the PWM signal that is applied to the driven coils. Zero crossing detection of these BEMF signals can be sampled at specific times, wherein commutation occurs at the mid-point between the zero crossing detections. However, these samples may be corrupted by the motor characteristics. Therefore, for proper flux integration the motor characteristics must be known, and the drive and motor voltages must also be in phase. Using field oriented control (FOC) requires high speed analog-to-digital converters (ADCs), computations are math intensive, e.g., high processing power required, and a non-FOC method has to be used to start the motor (BEMF measurements require the motor rotor to be turning).

SUMMARY

Therefore a need exists for much simplified BLDC motor control using adaptive zero-crossing detection.

According to an embodiment, a method for zero crossing detection for a brushless direct current (BLDC) motor may comprise the steps of: driving two phases of the three phase BLDC motor with pulse width modulation (PWM) drive voltage pulses, each PWM drive voltage pulse having a period and a duty cycle, and a voltage from a power source; coupling an un-driven third phase of the three phase BLDC motor to a voltage comparator for comparing back electromotive force (BEMF) voltages thereof; comparing the BEMF voltages to a reference voltage with the voltage comparator; measuring a falling time interval during a falling BEMF period when the BEMF voltages may be less than the reference voltage; storing the falling time interval; measuring a rising time interval during a rising BEMF period when the BEMF voltages may be greater than the reference voltage; storing the rising time interval; and comparing the stored falling and rising time intervals, wherein if the stored falling and rising time intervals may be substantially the same then do not change the reference voltage, and if the stored falling and rising time intervals may not be substantially the same then change the reference voltage.

According to a further embodiment of the method, the step of changing the reference voltage may comprise the step of adjusting the reference voltage until the falling and rising time intervals represent mid-points of falling and rising BEMF sequence periods, respectively. According to a further embodiment of the method, the BEMF voltages may be compared to the reference voltage with an analog voltage comparator. According to a further embodiment of the method, the reference voltage may be provided from an output of a digital-to-analog converter (DAC). According to a further embodiment of the method, the reference voltage may be increased when the rising time interval may be longer than the falling time interval. According to a further embodiment of the method, the reference voltage may be decreased when the rising time interval may be shorter than the falling time interval. According to a further embodiment of the method, the steps of storing the falling and rising time intervals may comprise the steps of storing the falling and rising time intervals in a memory associated with a digital processor of a microcontroller. According to a further embodiment of the method, the step of comparing the stored falling and rising time intervals may comprise the step of comparing the stored falling and rising time intervals with a digital processor of a microcontroller. According to a further embodiment of the method, the steps of measuring the falling and rising time intervals may comprise the steps of measuring the falling and rising time intervals with a timer-counter.

According to a further embodiment of the method, and before starting the BLDC motor, may comprise the steps of: measuring a high motor power supply voltage to be coupled to a phase of the three phase BLDC motor; measuring a low motor power supply voltage to be coupled to another phase of the three phase BLDC motor; and averaging the high and low motor power supply voltages to determine an initial reference voltage therefrom. According to a further embodiment of the method, the steps of measuring high and low motor power supply voltages may comprise the steps of measuring the high and low motor power supply voltages with an analog-to-digital converter (ADC), converting the measured high and low motor power supply voltages into digital representations thereof, and coupling these digital representations to a digital processor of a microcontroller.

According to another embodiment, an apparatus for brushless direct current (BLDC) adaptive zero crossing detection may comprise: an analog-to-digital converter (ADC); a voltage comparator having a first input coupled to an output of the ADC, and a second output coupled to a floating phase of a BLDC motor and adapted for measuring back electromotive force (BEMF) voltages therefrom; an AND gate having a first input coupled to an output of the voltage comparator and a second input coupled to a pulse width modulation (PWM) period signal; an inverter having an input coupled to the PWM period signal; a set-reset (RS) latch having a set input coupled to an output of the AND gate and a reset input coupled to an output of the inverter; and a D-latch having a D-input coupled to a Q-output of the SR-latch and a clock input coupled to the output of the inverter.

According to a further embodiment, an exclusive OR (XOR) gate may be coupled between the SR-latch and the D-latch, wherein the Q-output of the SR-latch may be coupled to a first input of the XOR gate, the D-input of the D-latch may be coupled to an output of the XOR gate, and a BEMF period selection signal may be couple to a second input of the XOR gate. According to a further embodiment, when the BEMF period selection signal may be at a high logic level, the D-input of the D-latch may be inverted from the Q-output of the SR-latch, and when the BEMF period selection signal may be at a low logic level, the D-input of the D-latch may be at the same logic level as the Q-output of the SR-latch.

According to yet another embodiment, a motor controller using brushless direct current (BLDC) adaptive zero crossing detection for providing pulse width modulation (PWM) drive to a BLDC motor may comprise: high and low side power switches coupled to each BLDC motor terminal, wherein the high and low side power switches may be further coupled to a high motor supply voltage and a low motor power supply voltage, respectively, and controlled by the PWM drive, wherein each of the high and low side power switches will connect a respective one of the BLDC motor terminals to either the high motor supply voltage, the low motor power supply voltage, or neither and left floating; a PWM master time base; PWM generators coupled to the PWM master time base and respective ones of the high and low side power switches; an adaptive zero crossing detection circuit adapted for coupling to a floating phase terminal of the BLDC motor and for receiving back electromotive force (BEMF) voltages therefrom, wherein the adaptive zero crossing detection circuit: compares the BEMF voltages to a reference voltage, measures a rising time interval during a rising BEMF period when the BEMF voltages may be greater than the reference voltage, measures a falling time interval during a falling BEMF period when the BEMF voltages may be less than the reference voltage, and adjusts the reference voltage until the rising and falling time intervals may be substantially the same; and a microcontroller for generating a PWM drive signal based upon the reference voltage.

According to a further embodiment, the adaptive zero crossing detection circuit may comprise: a three input analog multiplexer, each input thereof may be coupled to a respective phase of the three phase BLDC motor, wherein a floating phase of the BLDC motor may be selected for measuring back electromotive force (BEMF) voltages therefrom; a digital-to-analog converter (DAC); a voltage comparator having a first input coupled to the output of the multiplexer and a second input coupled to an output of the DAC; an AND gate having a first input coupled to an output of the voltage comparator and a second input coupled to a pulse width modulation (PWM) period signal; an inverter having an input coupled to the PWM period signal; a set-reset (RS) latch having a set input coupled to an output of the AND gate and a reset input coupled to an output of the inverter; and a D-latch having a D-input coupled to a Q-output of the SR-latch and a clock input coupled to the output of the inverter; a BEMF timer having an input coupled to a Q-output of the D-latch and adapted for measuring the rising and falling time intervals; and a digital processor and memory, wherein the digital processor may be coupled to digital inputs of the DAC, a time interval output from the BEMF timer, and a control input of the multiplexer.

According to a further embodiment, an exclusive OR (XOR) gate may be coupled between the SR-latch and the D-latch, wherein the Q-output of the SR-latch may be coupled to a first input of the XOR gate, the D-input of the D-latch may be coupled to an output of the XOR gate, and a BEMF period selection signal from the digital processor may be couple to a second input of the XOR gate. According to a further embodiment, an analog-to-digital converter (ADC) may have an input coupled to an output of the multiplexer and digital outputs coupled to the digital processor.

According to still another embodiment, a system for driving a brushless direct current (BLDC) motor using adaptive zero crossing detection may comprise: a three phase BLDC motor having first, second and third motor phase terminals; high and low side power switches coupled to each of the motor phase terminals, wherein the high and low side power switches may be further coupled between a high power supply voltage and a low power supply voltage, respectively, and controlled by the PWM drive, wherein each of the high and low side power switches will connect respective one of the BLDC motor phase terminals to either the high motor supply voltage, the low motor supply voltage, or neither and left floating; a PWM master time base; PWM generators coupled to the PWM master time base and respective ones of the high and low side power switches; an adaptive zero crossing detection circuit adapted for coupling to a floating motor phase terminal of the BLDC motor and for receiving back electromotive force (BEMF) voltages therefrom, wherein the adaptive zero crossing detection circuit compares the BEMF voltages to a reference voltage, measures a rising time interval during a rising BEMF period when the BEMF voltages may be greater than the reference voltage, determines a falling time interval during a falling BEMF period when the BEMF voltages may be less than the reference voltage, and adjusts the reference voltage until the rising and falling time intervals may be substantially the same; and a microcontroller for generating a PWM drive signal based upon the reference voltage.

According to a further embodiment, high and low driver pairs may be coupled between the PWM generators and respective ones of the high and low side power switches. According to a further embodiment, the high and low side power switches may comprise high and low side power metal oxide semiconductor field effect transistors (MOSFETs).

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to various embodiments, a digital-to-analog converter (DAC) may be used to provide a BEMF reference voltage. A voltage comparator may be used to detect a zero-crossing event from BEMF voltages coupled from an un-driven motor phase of a BLDC motor. The DAC level is then adjusted to keep the applied voltage waveform in phase with the motor generated waveform. In conventional BLDC control systems, there is a strong resistance to BEMF references that are not derived in some manner from the motor supply voltage or motor terminals themselves. The present embodiments disclosed herein break from that trend and offer primarily a hardware solution whereas prior BLDC control technologies have been focused on software solutions.

Referring now to the drawings, the details of specific example embodiments are schematically illustrated. Like elements in the drawings will be represented by like numbers, and similar elements will be represented by like numbers with a different lower case letter suffix.

Figure 1:
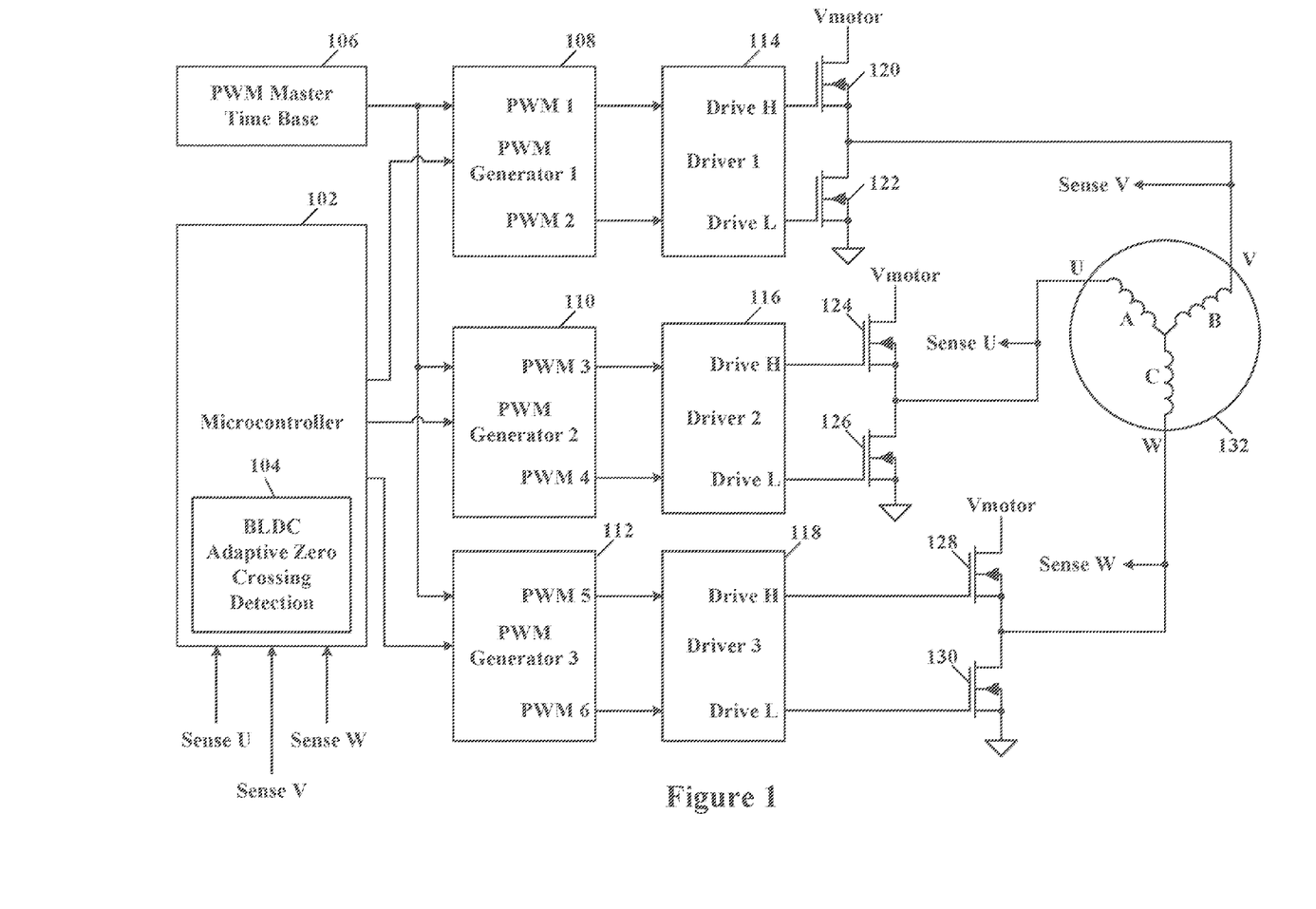
FIG. 1 illustrates a schematic block diagram of a three phase BLDC motor comprising stator windings connected in WYE, stator winding driver power transistors and a BLDC controller, according to a specific example embodiment of this disclosure.

Referring to FIG. 1, depicted is a schematic block diagram of a three phase BLDC motor comprising stator windings connected in WYE, stator winding driver power transistors and a BLDC controller, according to a specific example embodiment of this disclosure. A three phase BLDC motor 132 may be driven by three sets of power switches 120-130, e.g., power metal oxide semiconductor (MOSFET) transistors, that alternately couples the motor terminals, U, V or W; to a power supply common, a power supply voltage, Vmotor; or allows a motor terminal to "float," i.e., not connected to either power supply common or voltage. These power switches 120-130 may be driven by high/low drivers 114-118. The high/low drivers 114-118 may be coupled to PWM generators 108-112 that may receive a master clock signal from a PWM master time base 106. Duty cycle control of the PWM signals from the PWM generators 108-112 may be provided by a microcontroller 102 comprising a BLDC adaptive zero crossing detection circuit 104. The microcontroller 102 may also monitor the BEMF voltage at each stator winding terminal, U, V and W, and compare the monitored BEMF at each of the stator winding terminals, U, V and W, to a reference voltage, as more fully described hereinafter.

Figure 2:
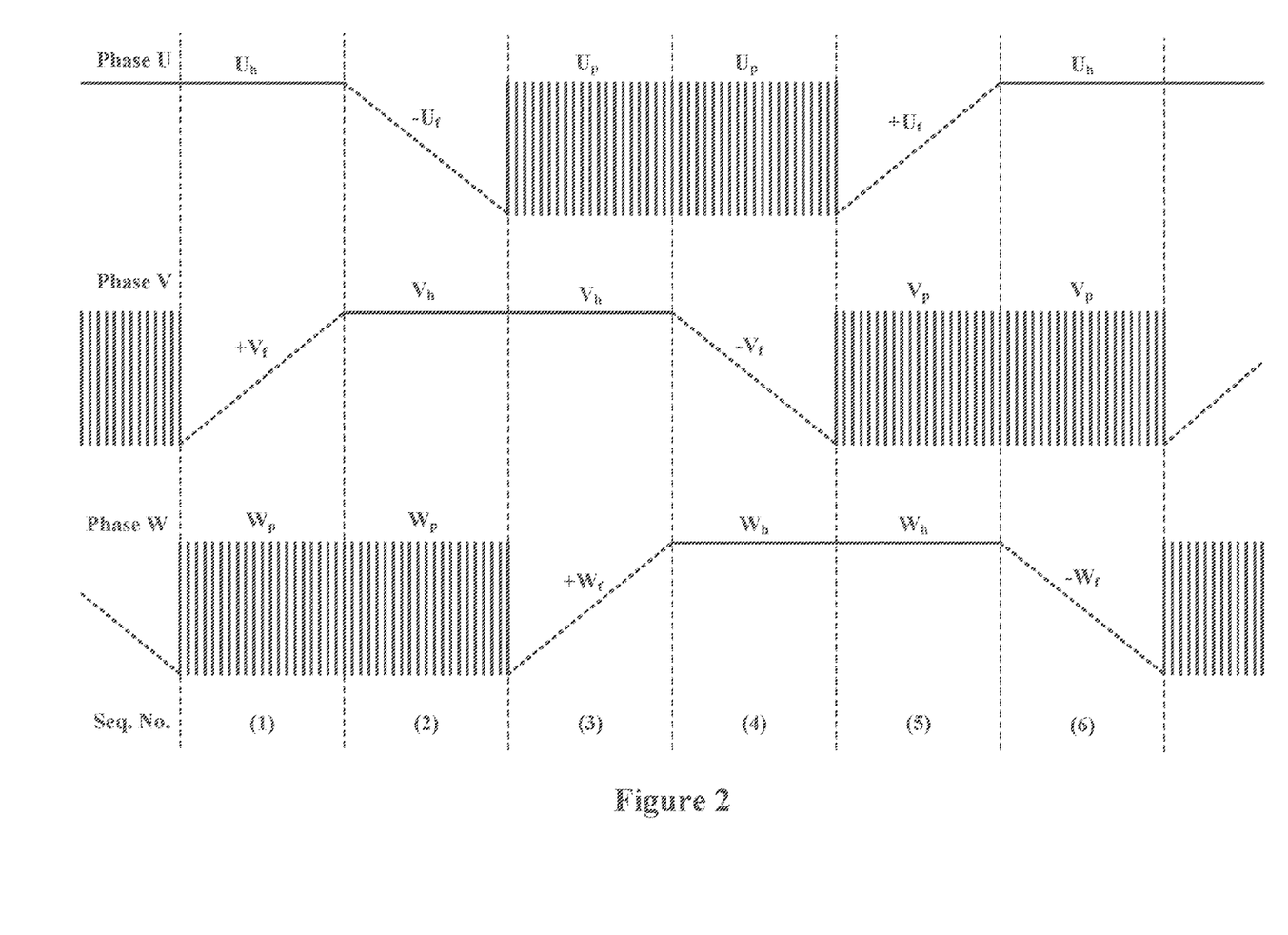
FIG. 2 illustrates schematic graphs of voltage waveforms at each of the three stator windings over a six sequence, 360 electrical degree rotation of the BLDC motor, according to the teachings of this disclosure.

Referring to FIG. 2, depicted are schematic graphs of voltage waveforms at each of the three stator windings over a six sequence, 360 electrical degree rotation of the BLDC motor, according to the teachings of this disclosure. Each phase U, V and W, is coupled (not at the same time) to the Vmotor voltage continuously, e.g., $U_h$; PWM voltages from ground to Vmotor, e.g., $W_d$; or floating, e.g., $U_f$. In each sequence step number a combination of one phase, $x_h$, ("the held phase") is maintained at a fixed voltage; another phase, $x_d$, ("the driven phase") is driven by a PWM period signal switching between Vmotor and ground; and a third phase, $x_f$, ("the floating phase") is not connected to any voltage or ground, e.g., floating. A BEMF voltage is measured at the floating phase and used in the BLDC adaptive zero crossing detection circuit 104, more fully explained hereinafter and shown in FIG. 3. The phase held at the fixed voltage may be coupled to either the Vmotor voltage or to ground, either of which is contemplated herein for all purposes.

Figure 3:
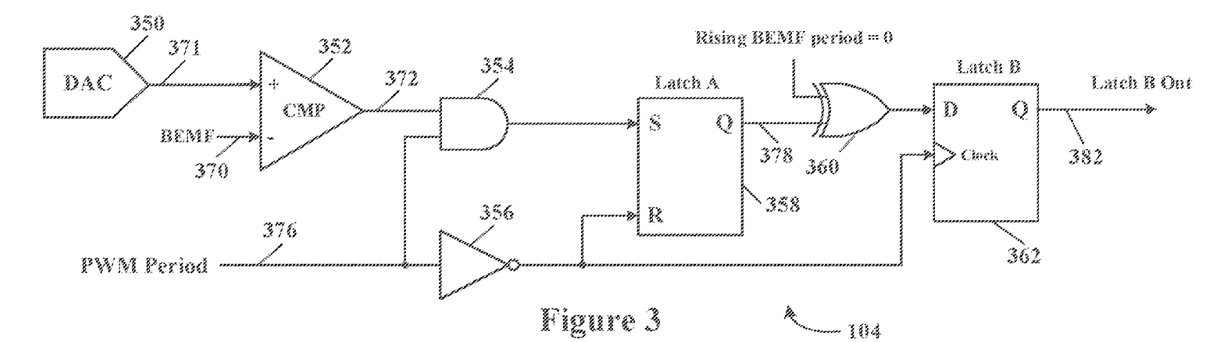
FIG. 3 illustrates a schematic block diagram of a BLDC adaptive zero crossing detection circuit during a rising BEMF period, according to a specific example embodiment of this disclosure.

Referring to FIG. 3, depicted is a schematic block diagram of a BLDC adaptive zero crossing detection circuit during a rising BEMF period, according to a specific example embodiment of this disclosure. A BLDC adaptive zero crossing detection circuit, generally represented by the numeral 104, may comprise a digital-to-analog converter (DAC) 350, an analog voltage comparator 352, a two-input AND gate 354, an inverter 356, a RS-latch 358, an XOR 360 and a D-latch 362. A PWM period signal 376 is coupled to inputs of the AND gate 354 and inverter 356. The PWM period signal 376 has the same period as does the driven phase PWM signal 484, but its duty cycle is maintained at a fixed percentage long enough to ensure the detection of the peaks of the BEMF voltages.

Operation of the BLDC adaptive zero crossing detection circuit 104 is as follows: The DAC 350 provides a reference voltage 371 to the positive input of the comparator 352. The BEMF voltage 370 (with appropriate voltage scaling), taken from a floating phase, is applied to the negative input of the comparator 352. When the BEMF voltage 370 is greater than the reference voltage 371 from the DAC 350, the output 372 of the voltage comparator 352 is at a logic low ("0"). When the BEMF voltage 370 is less than the reference voltage 371 from the DAC 350, the output 372 of the voltage comparator 352 is at a logic high ("1"). When both the output 372 and the PWM period 376 are at a high logic level the output of NAND gate 354, coupled to the S-input of the SR-latch 358, is at a high logic level. When the PWM period signal 376 is at a low logic level, the output of the NAND gate 354 will be at a low logic level irrespective of the logic level of the output 372.

The RS-latch 358 acts as a one bit memory wherein when the S-input is at a high logic level and the R-input is at a low logic level the Q-output 378 will be at a high logic level. When the S-input is at either a high or a low logic level and the R-input is at a high logic level the Q-output 378 will be at a low logic level. When both the S-input and the R-input are at a low logic level the Q-output will be unchanged and either at a high or low logic level. When one input of the XOR gate 360 is held at a high logic level the output therefrom will be inverted (opposite logic level) as its other input. Thus the XOR gate 360 may be used to invert the Q-output 378 logic level that is coupled to the D-input of the D-latch 362. When the clock input of the D-latch 362 goes from a low to a high logic level, whatever logic level that is at the D-input of the D-latch 362 will be transferred to its Q-output 382. The Q-output 382 will maintain that logic level until its D-input changes logic level and its clock input again goes from a low to a high logic level. Thus the Q-output 382 will only update when the PWM period 376 goes from a high to a low logic level.

According to various embodiments, before the motor 132 is started, the high side driver of one of the phases is enabled and the voltage at that phase is measured, then the high side driver is disabled and the low side driver of one of the phases is enabled and voltage at that phase is measured. The average of these two measurements is calculated to determine the voltage midway between the two. At start-up this average voltage is used in determining what the initial voltage from the DAC 350 should be set at and used for the comparator reference voltage 371. During normal BLDC motor operation where two of the motor phases are driven (driven and held) and the third un-driven motor phase (floating) is monitored via the non-reference input of the comparator 352 (BEMF 370). The comparator 352 output 372 is sampled over a portion of each PWM period driven phase 484. The sample window is generated by a second PWM period signal 376 that has the same period but a different duty cycle than the PWM period driven phase 484. The comparator 352 output 372 is coupled through the AND gate 354 to the S-input of the RS-latch 358. If the comparator 352 output 372 goes to a high logic level at any time during this window time then the RS-latch 358 will capture and hold that event until the end of the PWM period signal 376. The output 378 of the RS-latch 358 may be sampled and held by the D-latch 362 at the end of the second PWM period signal 376 immediately prior to the resetting of the RS-latch 358. The output of D-latch 362 is the zero-cross event detection signal 382. The RS-latch 358 output 378 polarity in falling BEMF commutation cycles are opposite that of rising BEMF commutation cycles such that the zero-crossing event output from the D-latch 362 is always a low to high logic level transition. The DAC 350 output voltage 371 is adjusted at various motor 132 speeds to keep the high period of the zero-cross event detection signal 382 substantially equal for both the rising and falling BEMF commutation cycles, as more fully shown in FIGS. 5 and 6 and their associated explanations hereinbelow.

Figure 4:
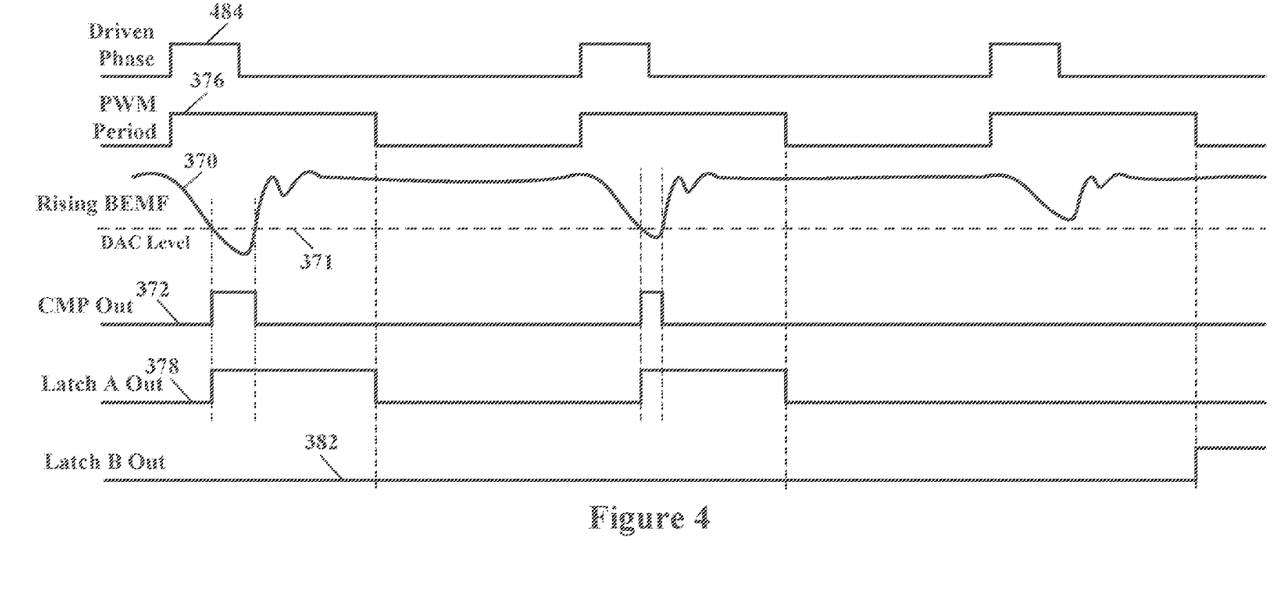
FIG. 4 illustrates schematic timing and voltage waveform diagrams for a rising BEMF period of the BLDC adaptive zero crossing detection circuit shown in FIG. 3.

Referring now to FIG. 4, depicted are schematic timing and voltage waveform diagrams for a rising BEMF period of the BLDC adaptive zero crossing detection circuit shown in FIG. 3. Voltage is measured at a floating phase and a BEMF 370 voltage is derived therefrom. The output 372 from the voltage comparator 352 will go to a high logic level whenever the BEMF 370 is less than the DAC 350 output reference voltage 371. As soon as the output 372 goes to a high logic level and the PWM period signal is at a high logic level, the Q-output 378 of the SR-latch 358 will go to a high logic level and stay at that logic level until the PWM period signal 376 goes back to a logic low. When a low logic level is asserted on one input of the XOR gate 360 the output thereof will be at the opposite logic level as the logic level on its other input, e.g., input=0, output=1. Thus, when the output 378 is at a high logic level the D-latch output 382 will go to a low logic level when the PWM period signal 376 goes from a high to a low logic level. And when the output 378 is at a low logic level the D-latch output 382 will go to a high logic level when the PWM period signal 376 goes from a high to a low logic level.

Figures 3A, 4A:
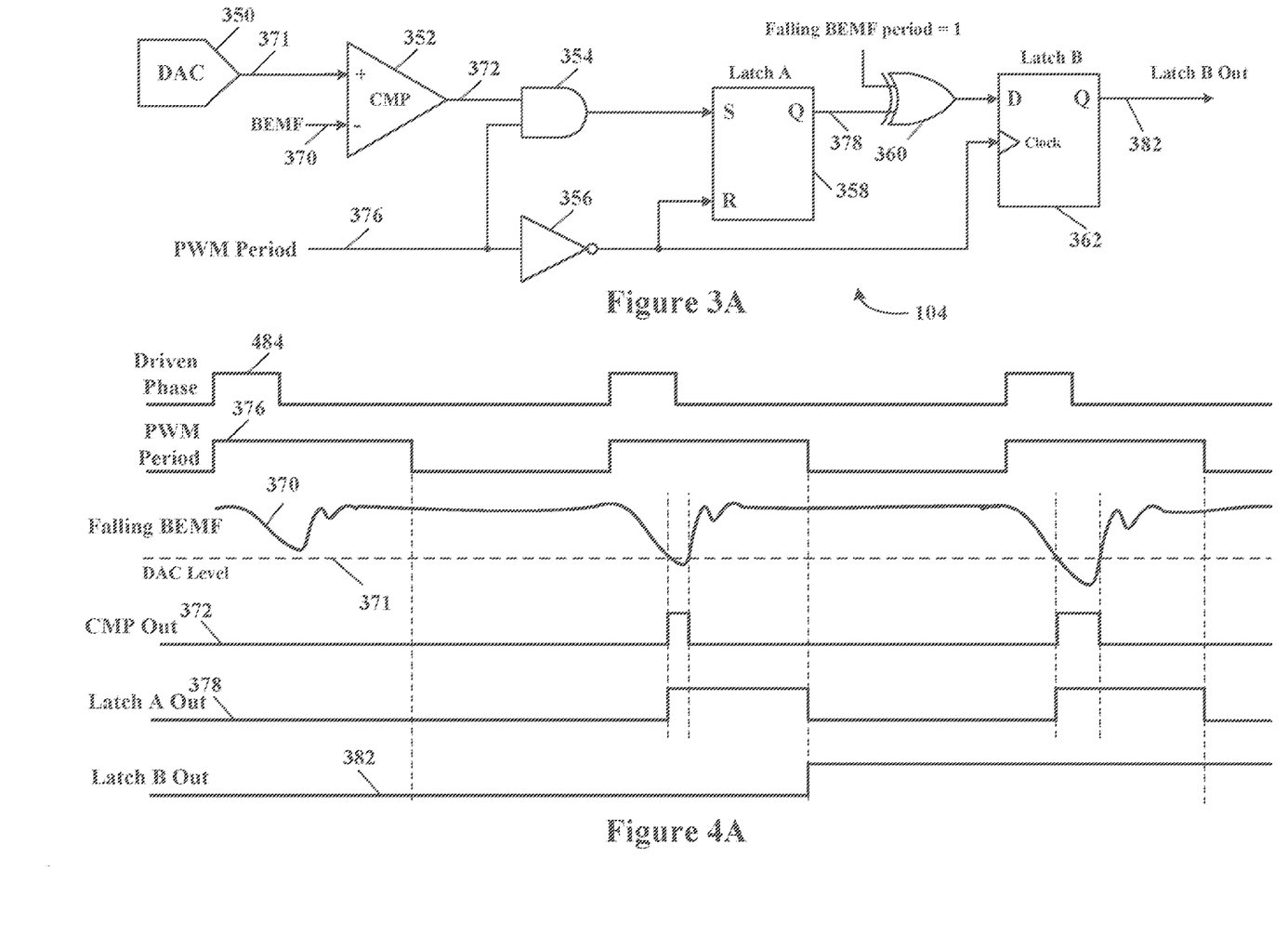
FIG. 3A illustrates a schematic block diagram of a BLDC adaptive zero crossing detection circuit during a falling BEMF period, according to a specific example embodiment of this disclosure.
FIG. 4A illustrates schematic timing and voltage waveform diagrams for a falling BEMF period of the BLDC adaptive zero crossing detection circuit shown in FIG. 3A.

Referring to FIG. 3A, depicted is a schematic block diagram of a BLDC adaptive zero crossing detection circuit during a falling BEMF period, according to a specific example embodiment of this disclosure. The circuit shown in FIG. 3A works in substantially the same way as the circuit shown in FIG. 3, except that when one input of the XOR gate 360 is held at a low logic level the output therefrom will not be inverted and its output will be the same as its other input. Thus the XOR gate 360 in this configuration couples the Q-output 378 logic level to the D-input of the D-latch 362 without a logic level inversion.

Referring to now FIG. 4A, depicted are schematic timing and voltage waveform diagrams for a falling BEMF period of the BLDC adaptive zero crossing detection circuit shown in FIG. 3A. Voltage is measured at a floating phase and a BEMF 370 voltage is derived therefrom. The output 372 from the voltage comparator 352 will go to a high logic level whenever the BEMF 370 is less than the DAC 350 output reference voltage 371. As soon as the output 372 goes to a high logic level and the PWM period signal is at a high logic level, the Q-output 378 of the SR-latch 358 will go to a high logic level and stay at that logic level until the PWM period signal 376 goes back to a logic low. When a high logic level is asserted on one input of the XOR gate 360 the output thereof will be at the same logic level as the logic level on its other input, e.g., input=1, output=1. Thus, when the output 378 is at a high logic level the D-latch output 382 will go to a high logic level when the PWM period signal 376 goes from a high to a low logic level. And when the output 378 is at a low logic level the D-latch output 382 will go to a low logic level when the PWM period signal 376 goes from a high to a low logic level.

During a rising BEMF period the output 382 of the D-latch 362 will go from a low to a high logic level after the first BEMF voltage (pulse) that is greater than the DAC 350 reference voltage output 371. During a falling BEMF period the output 382 of the D-latch 362 will go from a low to a high logic level after the first BEMF voltage (pulse) that is less than the DAC 350 reference voltage output 371. What is desired is that the duty cycles from the output 382 of the D-latch 362, derived from the combined rising and falling BEMF voltages 370 compared to the reference voltage 371, have substantially the same time periods, e.g., fifty (50) percent. The DAC 350 output voltage 371 may be adjusted until this fifty percent duty cycle is achieved, as more fully explained hereinafter.

Figure 5:
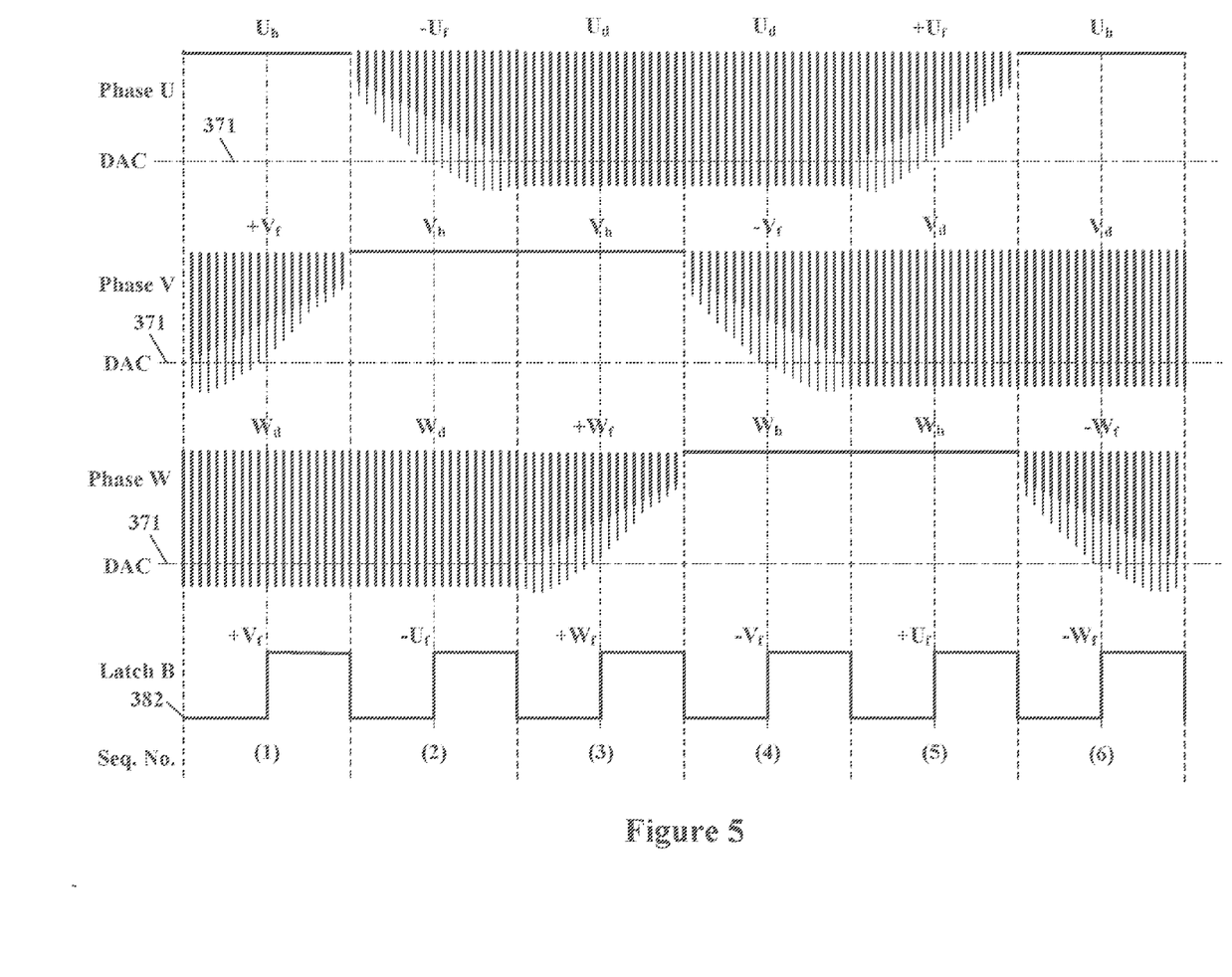
FIG. 5 illustrates schematic timing and voltage waveform diagrams for three phases of a BLDC motor over a 360 electrical degree, six sequence rotation when a reference voltage is substantially optimal for comparing with measured BEMF voltages, according to a specific example embodiment of this disclosure.

Referring to FIG. 5, depicted are schematic timing and voltage waveform diagrams for three phases of a BLDC motor over a 360 electrical degree, six sequence rotation when a reference voltage is substantially optimal for comparing with measured BEMF voltages, according to a specific example embodiment of this disclosure. During sequence number 1, Phase U is held at the motor voltage, Phase V is floating at a rising BEMF, and Phase W is driven. During sequence number 2, Phase U is floating at a falling BEMF, Phase V is held at the motor voltage, and Phase W is driven. During sequence number 3, Phase U is driven, Phase V is held at the motor voltage, and Phase W is floating at a rising BEMF. During sequence number 4, Phase U is driven, Phase V is floating at a falling BEMF, and Phase W is held at the motor voltage. During sequence number 5, Phase U is floating at a rising BEMF, Phase V is driven, and Phase W is held at the motor voltage. During sequence number 6, Phase U is held at the motor voltage, Phase V is driven, and Phase W is floating at a falling BEMF. The duty cycle of the output 382 from the D-latch 362 (Latch B) is substantially fifty (50) percent, which is optimal according to the teachings of this disclosure.

Figure 6:
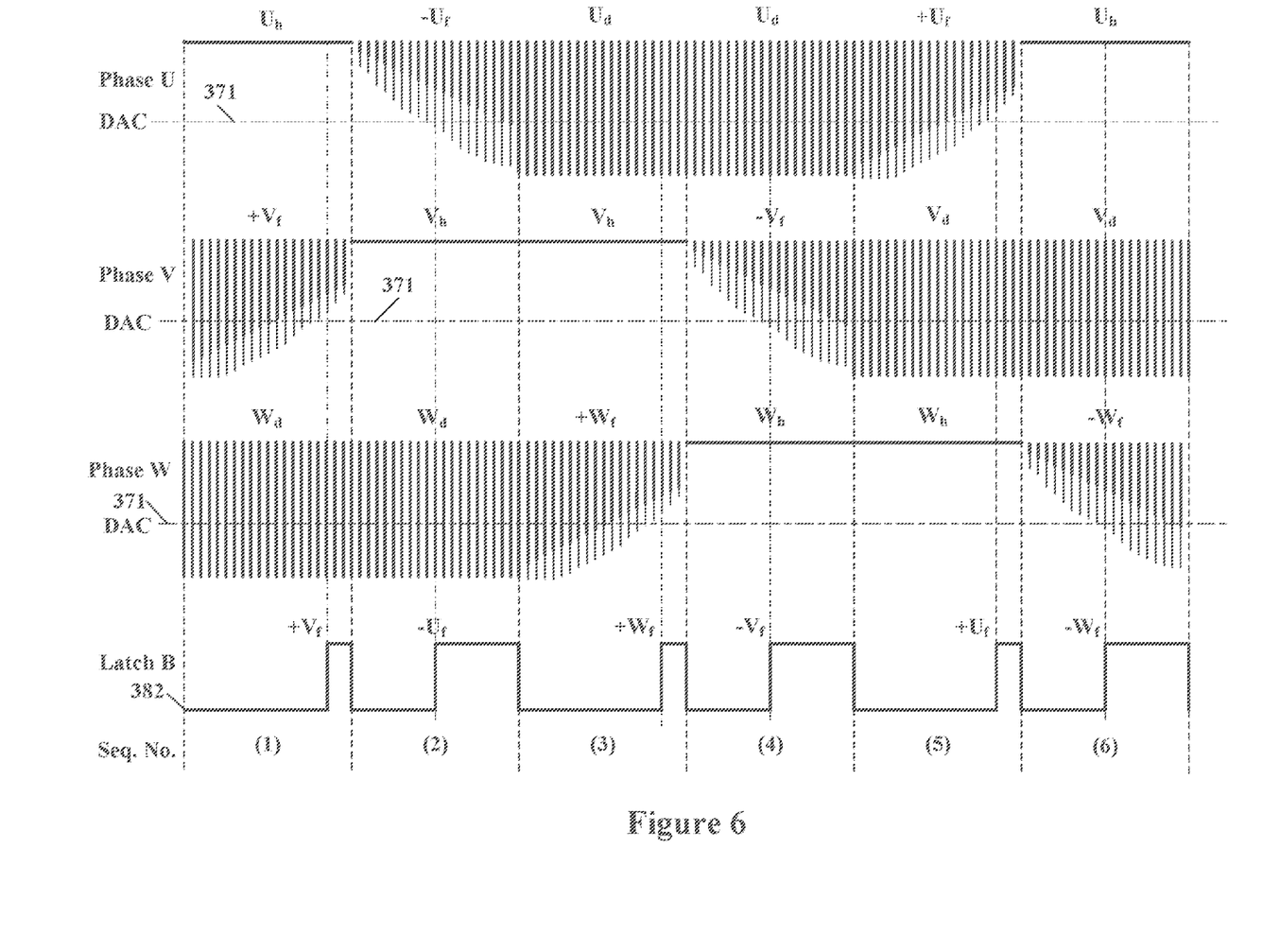
FIG. 6 illustrates schematic timing and voltage waveform diagrams for three phases of a BLDC motor over a 360 electrical degree, six sequence rotation when a reference voltage is too high for comparing with measured BEMF voltages, according to a specific example embodiment of this disclosure.

Referring to FIG. 6, depicted are schematic timing and voltage waveform diagrams for three phases of a BLDC motor over a 360 electrical degree, six sequence rotation when a reference voltage is too high for comparing with measured BEMF voltages, according to a specific example embodiment of this disclosure. The motor phase connections or non-connection conditions for each phase are the same as those described for FIG. 5 above, except that the duty cycle of the output 382 from the D-latch 362 (Latch B) is not at substantially fifty (50) percent, which indicates that the reference voltage at output 371 of the DAC 350 is not optimal according to the teachings of this disclosure. The reference voltage must be adjusted (changed) in this case because the reference voltage is too high and must be lowered.

Commutation may be phase locked to the motor in either a rising or falling BEMF period. It doesn't matter which one but only one can be selected. Define for purposes of explanation but not limitation, the period in which the zero crossing (ZC) event is captured as the "ZC period" and the other as the "commutation time (CT) period." The phase lock formulas are:

$$ZCE(n) = ZC(n') - CT(n)/2 \quad [1]$$

$$CT(n+1) = CT(n) + ZCE(n) * k \quad [2]$$

$$ZC(n') = ZC(n) + \text{offset} - \text{balance} \quad [3]$$

$$X = CT(n)/2 + \text{offset} + \text{balance} \quad [4]$$

Where:
ZCE(n)=zero cross error (from expected ZC).
ZC(n)=the interval from commutation to the zero cross event (Latch B rising edge).
CT(n)=the commutation period interval.
k=the damping factor, usually ¼ or ⅛.
X=interval from ZC event to the next commutation.
offset=the number of timer ticks to shift the phase. (Not really necessary to know in this application since phase is also shifted by moving the reference voltage but included here for completeness).
balance=number of timer ticks to shift time between rising and falling BEMF periods. (Only important in very high speed operation and compensates for drive and measurement latencies to keep the ZC and CT periods equal).
timer ticks=resolution of ZC and CT interval timing.

Phase lock works as follows: the interval in the ZC period is measured from the commutation event to the ZC event and is saved as ZC(n). The next commutation event is scheduled to occur at time X after the ZC event which terminates the ZC period and starts the next CT period. The next commutation is scheduled to occur at time CT(n) which terminates the CT period and starts the next ZC period. All calculations are performed during the CT period.

The aforementioned phase lock procedure ensures that the Latch B duty cycle in the ZC periods (sequence numbers 2, 4 and 6) are fifty (50) percent. Both ZC and CT (sequence numbers 1, 3 and 5) periods are equal in duration. Therefore, only the high portion of the Latch B periods for the ZC and CT periods need to be compared. If they are substantially equal then the DAC voltage 371 is at the optimal level. If the high portion of the Latch B output in the CT period is shorter than that of the ZC period then the DAC voltage 371 needs to be lowered. Conversely, if the high portion of the Latch B output in the CT period is longer than that of the ZC period then the DAC voltage 371 needs to be raised. Consider that there are 4 possible ZC sense and phase lock conditions. In the following Table A below: Fixed indicates the side that is held or not modulated; ZC BEMF indicates phase lock in the rising or falling BEMF period; LB shorter indicates whether to increase or decrease the DAC voltage in response to a shorter Latch B high period; and LB longer indicates whether to increase or decrease the DAC voltage in response to a longer Latch B high period.

TABLE A

|   | Fixed | ZC BEMF | LB shorter | LB longer |
|---|---|---|---|---|
| 1. | High | falling | decrease | increase |
| 2. | High | rising | increase | decrease |
| 3. | Low | falling | decrease | increase |
| 4. | Low | rising | increase | decrease |

Figure 7:
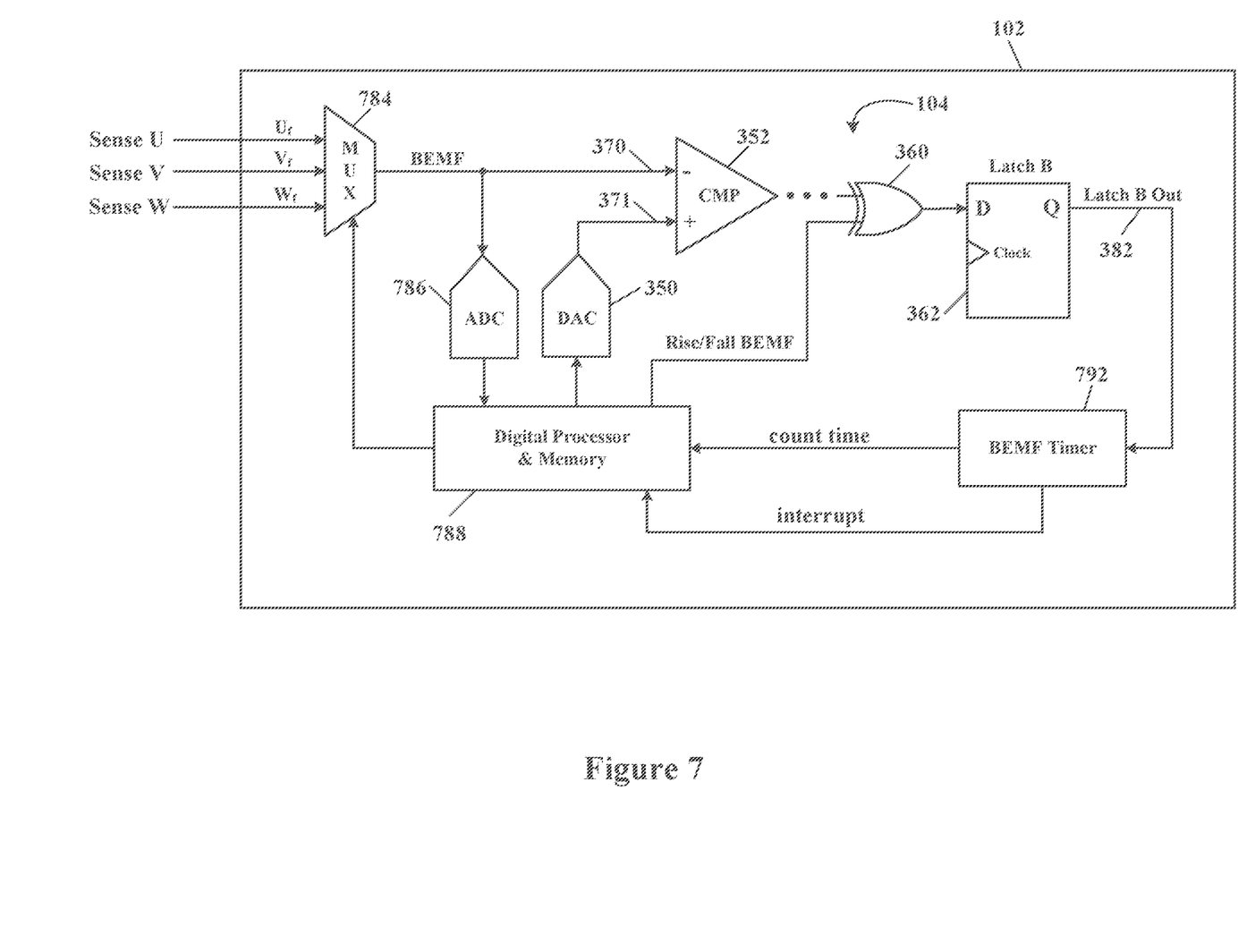
FIG. 7 illustrates a schematic block diagram of a BLDC motor controller having a BLDC adaptive zero crossing detection circuit, according to a specific example embodiment of this disclosure.

Referring to FIG. 7, depicted is a schematic block diagram of a BLDC motor controller having a BLDC adaptive zero crossing detection circuit, according to a specific example embodiment of this disclosure. The BLDC motor controller having a BLDC adaptive zero crossing detection circuit may be implemented using a microcontroller 102 comprising an analog multiplexer (MUX) 784, an analog-to-digital converter (ADC) 786, a digital-to-analog converter (DAC) 350, a digital processor and memory 788, an analog voltage comparator 354, an exclusive OR (XOR) gate 360, a D-latch 362, and a BEMF timer 792. The MUX 784 selects the motor phase that is floating so that its BEMF may be compared to the reference voltage 371 with the voltage comparator 352. The BEMF voltage may be scaled down (voltage divider) before being coupled to the MUX 784 at a compatible voltage level for integrated circuit electronics. The ADC 786 may be used to measure high and low motor power supply voltages before the motor 132 is started up. The ADC 786 converts the measured high and low motor power supply voltages to digital representation thereof and couples these digital representations to the digital processor 788. The ADC 786 may be used to obtain the high and low motor power supply voltages for initially determining an analog reference voltage value to be generated by the DAC 350 and coupled to an input of the voltage comparator 352. It is contemplated and within the scope of this disclosure that the ADC 786 may have its own associated, e.g., integral, multiplexer (not shown) having inputs coupled to the Sense U, V and W terminals of the motor 132, and controlled independently by the digital processor 788. However, for simplicity of explanation only one multiplexer 784 is shown.

The BEMF timer may be coupled to the output 382 of the D-latch 362 and used in determining the time intervals of when the output 382 is at a high logic level. The BEMF timer may start to counting (time interval) when the output 382 goes from a low logic level to a high logic level and continue counting so long as the output 382 remains at a high logic level, then resets its time interval count when the output 382 goes back to a low logic level. But before doing so, the BEMF timer 792 may send an interrupt to the digital processor 788 and transfer the time interval thereto. The digital processor 788 may store the time intervals (count values) from the BEMF timer 792 and compare the count time intervals associated with the rising BEMF to the count times intervals associated with falling BEMF. Preferably the rising and falling BEMF count time intervals will be substantially the same. When they are not, the digital processor 788 may adjust the digital voltage reference value to the DAC 350, (thereby changing the analog reference voltage 371 coupled to the voltage comparator 352) to make the rising and falling BEMF count time intervals substantially the same, as described in Table A above. Using this digital voltage reference the microcontroller may then determine substantially optimal PWM drive signals for controlling rotation of the motor 132. It is contemplated and within the scope of this disclosure that one having ordinary skill in the analog and digital electronic design arts and having the benefit of this disclosure, could design alternate and equally effective circuits that would still be covered as the subject matter of what is being claimed as the invention disclosed herein.

Figure 8:
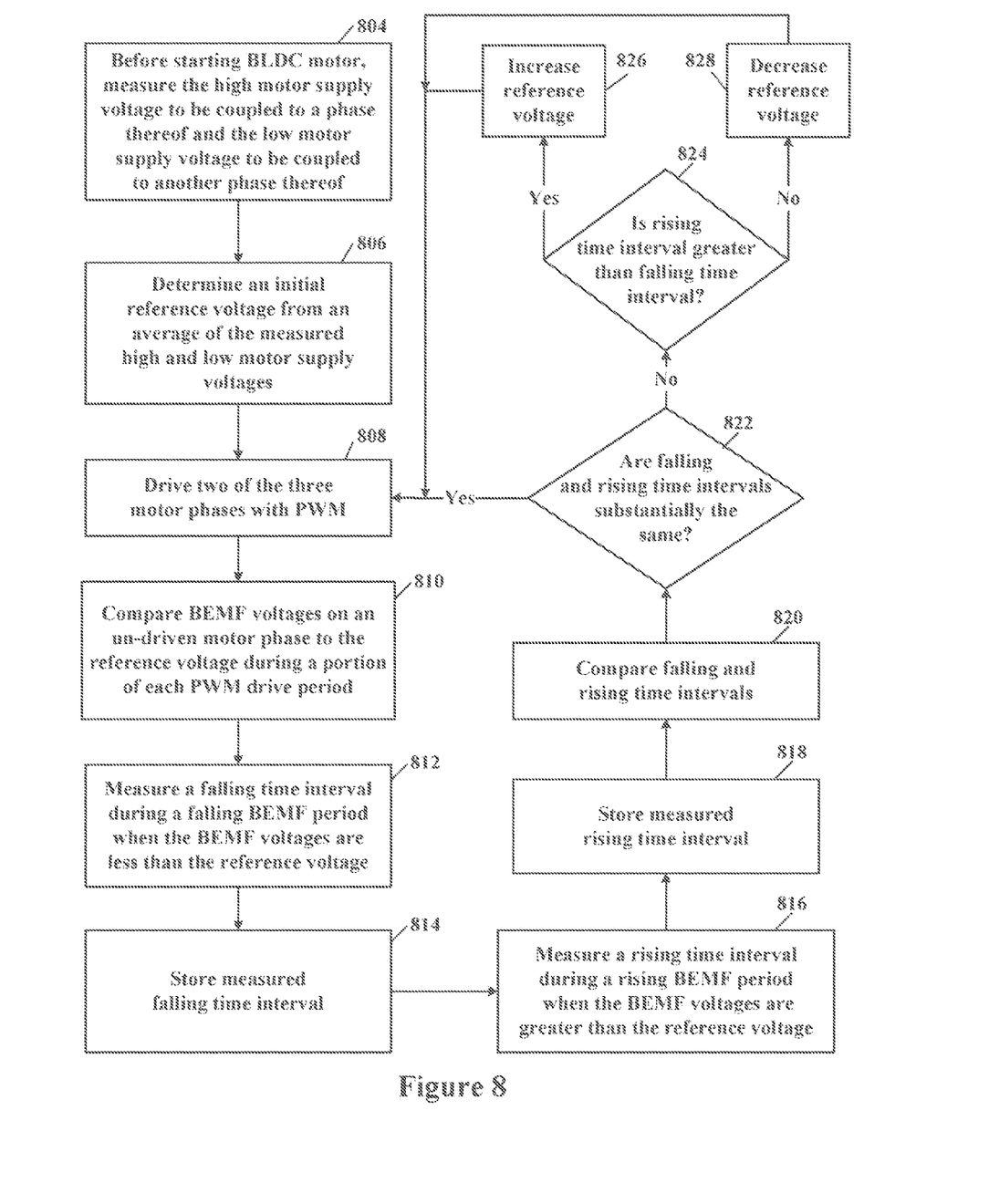
FIG. 8 illustrates a schematic operational flow diagram of a BLDC adaptive zero crossing detection circuit, according to a specific example embodiment of this disclosure.

Referring to FIG. 8, depicted is a schematic operational flow diagram of a BLDC adaptive zero crossing detection circuit, according to a specific example embodiment of this disclosure. In step 804, before starting the BLDC motor, a high motor supply voltage to be coupled to a phase thereof and a low motor supply voltage to be coupled to another phase thereof are measured. In step 806 an initial reference voltage is determined from an average of the high and low motor supply voltages. Steps 804 and 806 are only performed before the motor 132 starts. Then in step 808 the motor 132 starts to rotate by being driven in a six step sequence with two of the phases being driven pulse width modulation (PWM), wherein a third phase is un-driven (floating). In step 810 the BEMF voltages on the un-driven third phase are compared to the reference voltage during a portion of each PWM drive period. In step 812 a falling time interval is measured during a falling BEMF period of how long the BEMF voltages are less than the reference voltage. In step 814 the measured falling time interval is stored in a memory, e.g., digital processor memory 788. In step 816 a rising time interval is measured during a rising BEMF period of how long the BEMF voltages are greater than the reference voltage. In step 818 the measured rising time interval is stored in a memory, e.g., digital processor memory 788. In step 820 the falling and rising time intervals stored in memory are compared. In step 822 a determination is made whether the falling and rising time intervals are substantially the same. If so then return to step 808, and if not then go to step 824. In step 824 a determination is made whether the rising time interval is greater than or less than the falling time interval. If the rising time interval is greater than the falling time interval then in step 826 the reference voltage is increased and then return to step 808. If the rising time interval is less than the falling time interval then in step 828 the reference voltage is decreased and then return to step 808.

The invention claimed is:

1. A method for zero crossing detection for a brushless direct current (BLDC) motor, said method comprising the steps of:
   driving two phases of the three phase BLDC motor with pulse width modulation (PWM) drive voltage pulses, each PWM drive voltage pulse having a period and a duty cycle, and a voltage from a power source;
   coupling an un-driven third phase of the three phase BLDC motor to a voltage comparator for comparing back electromotive force (BEMF) voltages thereof;
   comparing the BEMF voltages to a reference voltage with the voltage comparator;
   measuring a falling time interval during a falling BEMF period when the BEMF voltages are less than the reference voltage;
   storing the falling time interval;

measuring a rising time interval during a rising BEMF period when the BEMF voltages are greater than the reference voltage;

storing the rising time interval; and comparing the stored falling and rising time intervals, wherein if the stored falling and rising time intervals are substantially the same then do not change the reference voltage, and if the stored falling and rising time intervals are not substantially the same then change the reference voltage.

2. The method according to claim 1, wherein the step of changing the reference voltage comprises the step of adjusting the reference voltage until the falling and rising time intervals represent mid-points of falling and rising BEMF sequence periods, respectively.

3. The method according to claim 1, wherein the BEMF voltages are compared to the reference voltage with an analog voltage comparator.

4. The method according to claim 1, wherein the reference voltage is provided from an output of a digital-to-analog converter (DAC).

5. The method according to claim 1, wherein the reference voltage is increased when the rising time interval is longer than the falling time interval.

6. The method according to claim 1, wherein the reference voltage is decreased when the rising time interval is shorter than the falling time interval.

7. The method according to claim 1, wherein the steps of storing the falling and rising time intervals comprise the steps of storing the falling and rising time intervals in a memory associated with a digital processor of a microcontroller.

8. The method according to claim 1, wherein the step of comparing the stored falling and rising time intervals comprises the step of comparing the stored falling and rising time intervals with a digital processor of a microcontroller.

9. The method according to claim 1, wherein the steps of measuring the falling and rising time intervals comprise the steps of measuring the falling and rising time intervals with a timer-counter.

10. The method according to claim 1, further comprising before starting the BLDC motor the steps of:

measuring a high motor power supply voltage to be coupled to a phase of the three phase BLDC motor;

measuring a low motor power supply voltage to be coupled to another phase of the three phase BLDC motor; and averaging the high and low motor power supply voltages to determine an initial reference voltage therefrom.

11. The method according to claim 10, wherein the steps of measuring high and low motor power supply voltages comprise the steps of measuring the high and low motor power supply voltages with an analog-to-digital converter (ADC), converting the measured high and low motor power supply voltages into digital representations thereof, and coupling these digital representations to a digital processor of a microcontroller.

12. A motor controller using brushless direct current (BLDC) adaptive zero crossing detection for providing pulse width modulation (PWM) drive to a BLDC motor, comprising:

high and low side power switches coupled to each BLDC motor terminal, wherein the high and low side power switches are further coupled to a high motor supply voltage and a low motor power supply voltage, respectively, and controlled by the PWM drive, wherein each of the high and low side power switches will connect a respective one of the BLDC motor terminals to either the high motor supply voltage, the low motor power supply voltage, or neither and left floating;

a PWM master time base;

PWM generators coupled to the PWM master time base and respective ones of the high and low side power switches;

an adaptive zero crossing detection circuit adapted for coupling to a floating phase terminal of the BLDC motor and for receiving back electromotive force (BEMF) voltages therefrom, wherein the adaptive zero crossing detection circuit:

compares the BEMF voltages to a reference voltage, measures a rising time interval during a rising BEMF period when the BEMF voltages are greater than the reference voltage, measures a falling time interval during a falling BEMF period when the BEMF voltages are less than the reference voltage, and adjusts the reference voltage until the rising and falling time intervals are substantially the same; and a microcontroller for generating a PWM drive signal based upon the reference voltage.

13. The motor controller according to claim 12, wherein the adaptive zero crossing detection circuit comprises:

a three input analog multiplexer, each input thereof is coupled to a respective phase of the three phase BLDC motor, wherein a floating phase of the BLDC motor is selected for measuring back electromotive force (BEMF) voltages therefrom;

a digital-to-analog converter (DAC);

a voltage comparator having a first input coupled to the output of the multiplexer and a second input coupled to an output of the DAC;

an AND gate having a first input coupled to an output of the voltage comparator and a second input coupled to a pulse width modulation (PWM) period signal;

an inverter having an input coupled to the PWM period signal;

a set-reset (RS) latch having a set input coupled to an output of the AND gate and a reset input coupled to an output of the inverter; and a D-latch having a D-input coupled to a Q-output of the SR-latch and a clock input coupled to the output of the inverter;

a BEMF timer having an input coupled to a Q-output of the D-latch and adapted for measuring the rising and falling time intervals; and a digital processor and memory, wherein the digital processor is coupled to digital inputs of the DAC, a time interval output from the BEMF timer, and a control input of the multiplexer.

14. The apparatus according to claim 13, further comprising an exclusive OR (XOR) gate coupled between the SR-latch and the D-latch, wherein the Q-output of the SR-latch is coupled to a first input of the XOR gate, the D-input of the D-latch is coupled to an output of the XOR gate, and a BEMF period selection signal from the digital processor is couple to a second input of the XOR gate.

15. The apparatus according to claim 13, further comprising an analog-to-digital converter (ADC) having an input coupled to an output of the multiplexer and digital outputs coupled to the digital processor.

16. A system for driving a brushless direct current (BLDC) motor using adaptive zero crossing detection, said system comprising:
- a three phase BLDC motor having first, second and third motor phase terminals;
- high and low side power switches coupled to each of the motor phase terminals, wherein the high and low side power switches are further coupled between a high power supply voltage and a low power supply voltage, respectively, and controlled by the PWM drive, wherein each of the high and low side power switches will connect respective one of the BLDC motor phase terminals to either the high motor supply voltage, the low motor supply voltage, or neither and left floating;
- a PWM master time base;
- PWM generators coupled to the PWM master time base and respective ones of the high and low side power switches;
- an adaptive zero crossing detection circuit adapted for coupling to a floating motor phase terminal of the BLDC motor and for receiving back electromotive force (BEMF) voltages therefrom, wherein the adaptive zero crossing detection circuit
  - compares the BEMF voltages to a reference voltage,
  - measures a rising time interval during a rising BEMF period when the BEMF voltages are greater than the reference voltage,
  - determines a falling time interval during a falling BEMF period when the BEMF voltages are less than the reference voltage, and
  - adjusts the reference voltage until the rising and falling time intervals are substantially the same; and
- a microcontroller for generating a PWM drive signal based upon the reference voltage.

17. The system according to claim 16, further comprising high and low driver pairs coupled between the PWM generators and respective ones of the high and low side power switches.

18. The system according to claim 16, wherein the high and low side power switches comprise high and low side power metal oxide semiconductor field effect transistors (MOSFETs).

* * * * *

UNITED STATES PATENT AND TRADEMARK OFFICE
CERTIFICATE OF CORRECTION

PATENT NO. : 9,692,331 B2  
APPLICATION NO. : 15/053972  
DATED : June 27, 2017  
INVENTOR(S) : Ward R. Brown Page 1 of 1

It is certified that error appears in the above-identified patent and that said Letters Patent is hereby corrected as shown below:

On the Title Page (73) Assignee: MICROCHIP TECHNOLOGIES INCORPORATED... ---Change to---
MICROCHIP TECHNOLOGY INCORPORATED...

Signed and Sealed this
First Day of August, 2017

Joseph Matal
*Performing the Functions and Duties of the*
*Under Secretary of Commerce for Intellectual Property and*
*Director of the United States Patent and Trademark Office*